(12) United States Patent
Mizuno et al.

(10) Patent No.: US 11,209,895 B2
(45) Date of Patent: Dec. 28, 2021

(54) ELECTRONIC DEVICE, CONTROL METHOD, AND RECORDING MEDIUM

(71) Applicant: CASIO COMPUTER CO., LTD., Tokyo (JP)

(72) Inventors: Kimiyasu Mizuno, Akishima (JP); Tsuyoshi Minami, Musashimurayama (JP); Shuhei Uchida, Hamura (JP); Munetaka Seo, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/837,023

(22) Filed: Apr. 1, 2020

(65) Prior Publication Data
US 2020/0319698 A1 Oct. 8, 2020

(30) Foreign Application Priority Data
Apr. 2, 2019 (JP) .............................. JP2019-070676

(51) Int. Cl.
*G06F 1/32* (2019.01)
*G06F 1/3293* (2019.01)
(52) U.S. Cl.
CPC ................... *G06F 1/3293* (2013.01)
(58) Field of Classification Search
CPC ........................................................ G06F 1/32
See application file for complete search history.

(56) References Cited

U.S. PATENT DOCUMENTS

| | | | |
|---|---|---|---|
| 2004/0162922 A1* | 8/2004 | Kardach | G06F 13/102 710/15 |
| 2005/0182980 A1* | 8/2005 | Sutardja | G06F 1/3293 713/320 |

(Continued)

FOREIGN PATENT DOCUMENTS

| | | |
|---|---|---|
| JP | 2016-066129 A | 4/2016 |
| JP | 2016-161324 A | 9/2016 |

(Continued)

OTHER PUBLICATIONS

Notice of Reasons for Refusal dated Jun. 22, 2021 received in Japanese Patent Application No. JP 2019-070676 together with an English language translation.

*Primary Examiner* — Paul B Yanchus, III
(74) *Attorney, Agent, or Firm* — Scully Scott Murphy & Presser (57) ABSTRACT

An electronic device includes a first display; a second display for which power consumption is lower than that of the first display; a first communicator; a second communicator for which power consumption is lower than that of the first communicator; a memory; a first processor; a second processor for which power consumption is lower than that of the first processor; and an operation acquirer to, when an operation from a user is acquired, send a wake-up signal that causes the first processor to recover from a sleep state in which power consumption is suppressed to a normal state. The first processor is configured to, when a condition for transitioning to a power suppression state is satisfied, send a power suppression notification to the second processor, stop displaying by the first display and communicating by the first communicator, and transition to the sleep state, and to, when the wake-up signal is received from the second processor or the operation acquirer, recover to the normal state from the sleep state, and start displaying by the first (Continued)

display and communicating by the first communicator. The second processor is configured to, when the second processor receives the power suppression notification from the first processor, start displaying by the second display and communicating by the second communicator, and to, when a condition for transitioning to the normal state is satisfied, send the wake-up signal to the first processor, and stop the displaying by the second display and the communicating by the second communicator.

15 Claims, 7 Drawing Sheets

(56) References Cited

U.S. PATENT DOCUMENTS

| | | | | |
|---|---|---|---|---|
| 2012/0159218 | A1* | 6/2012 | Vangala | ............... G06F 1/3209 |
| | | | | 713/323 |
| 2015/0186092 | A1* | 7/2015 | Francis | ................. G06F 1/163 |
| | | | | 345/520 |

FOREIGN PATENT DOCUMENTS

| | | |
|---|---|---|
| JP | 2017-146614 A | 8/2017 |
| JP | 2018-105890 A | 7/2018 |
| JP | 2019-007818 A | 1/2019 |
| WO | 2014/087551 A1 | 6/2014 |

* cited by examiner

ELECTRONIC DEVICE, CONTROL METHOD, AND RECORDING MEDIUM

CROSS-REFERENCE TO RELATED APPLICATION

This application is based upon and claims the benefit of priority under 35 U.S.C. 119 of Japanese Patent Application No. 2019-070676 filed on Apr. 2, 2019, the entire disclosure of which, including the description, claims, drawings, and abstract, is incorporated herein by reference in its entirety.

FIELD

This application relates generally to an electronic device such as an electronic watch, a control method for the electronic device, and a recording medium.

BACKGROUND

Small electronic devices with advanced functionality, such as smart watches, are popular. The power consumption of advanced electronic devices is high and, when battery voltage decreases, all of the functions of the electronic device, including basic functions such as clock functions, stop. One example of a solution for this problem is the electronic watch disclosed in Unexamined Japanese Patent Application Kokai Publication No. 2016-161324. This electronic watch has a configuration whereby basic functions (clock functions and the like) can be maintained over an extended period of time by carrying out function limiting that corresponds to the voltage of a secondary battery.

SUMMARY

In a first aspect of the present disclosure, an electronic device includes:
 a first display;
 a second display for which power consumption is lower than that of the first display;
 a first communicator;
 a second communicator for which power consumption is lower than that of the first communicator;
 a memory;
 a first processor;
 a second processor for which power consumption is lower than that of the first processor; and
 an operation acquirer to, when an operation from a user is acquired, send a wake-up signal that causes the first processor to recover from a sleep state in which power consumption is suppressed to a normal state that is a normal operating state,
 wherein
 the first processor is configured, by a program stored in the memory, to:
  when a condition for transitioning to a power suppression state that is an operating state in which power consumption is suppressed is satisfied, send a power suppression notification to the second processor, stop displaying by the first display and communicating by the first communicator, and transition to the sleep state, and
  when the wake-up signal is received from the second processor or the operation acquirer, recover to the normal state from the sleep state, and start displaying by the first display and communicating by the first communicator, and the second processor is configured, by a program stored in the memory, to:
  when the second processor receives the power suppression notification from the first processor, start displaying by the second display and communicating by the second communicator, and
  when a condition for transitioning to the normal state is satisfied, send the wake-up signal to the first processor, and stop the displaying by the second display and the communicating by the second communicator.

In a second aspect of the present disclosure, a control method for an electronic device including a first display, a second display for which power consumption is lower than that of the first display, a first communicator, a second communicator for which power consumption is lower than that of the first communicator, a first processor, and a second processor for which power consumption is lower than that of the first processor includes:
 when a condition for transitioning to a power suppression state that is an operating state in which power consumption is suppressed is satisfied, stopping, by the first processor, displaying by the first display and communicating by the first communicator, transitioning the first processor to a sleep state in which power consumption is suppressed, and starting, by the second processor, displaying by the second display and communicating by the second communicator; and
 when a condition for transitioning to a normal state that is a normal operating state is satisfied, recovering the first processor from the sleep state to the normal state and starting, by the first processor, the displaying by the first display and the communicating by the first communicator, and stopping, by the second processor, the displaying by the second display and the communicating by the second communicator.

In a third aspect of the present disclosure, a non-transitory computer-readable recording medium having stored therein a program causes a computer of an electronic device including a first display, a second display for which power consumption is lower than that of the first display, a first communicator, a second communicator for which power consumption is lower than that of the first communicator, a first processor, and a second processor for which power consumption is lower than that of the first processor, to execute processing of:
 when a condition for transitioning to a power suppression state that is an operating state in which power consumption is suppressed is satisfied, stopping, by the first processor, displaying by the first display and communicating by the first communicator, transitioning the first processor to a sleep state in which power consumption is suppressed, and starting, by the second processor, displaying by the second display and communicating by the second communicator; and
 when a condition for transitioning to a normal state that is a normal operating state is satisfied, recovering the first processor from the sleep state to the normal state and starting, by the first processor, the displaying by the first display and the communicating by the first communicator, and stopping, by the second processor, the displaying by the second display and the communicating by the second communicator.

BRIEF DESCRIPTION OF THE DRAWINGS

A more complete understanding of this application can be obtained when the following detailed description is considered in conjunction with the following drawings, in which.

DETAILED DESCRIPTION

Hereinafter, embodiments are described while referencing the drawings. Note that, in the drawings, identical or corresponding components are marked with the same reference numerals.

Figure 1:
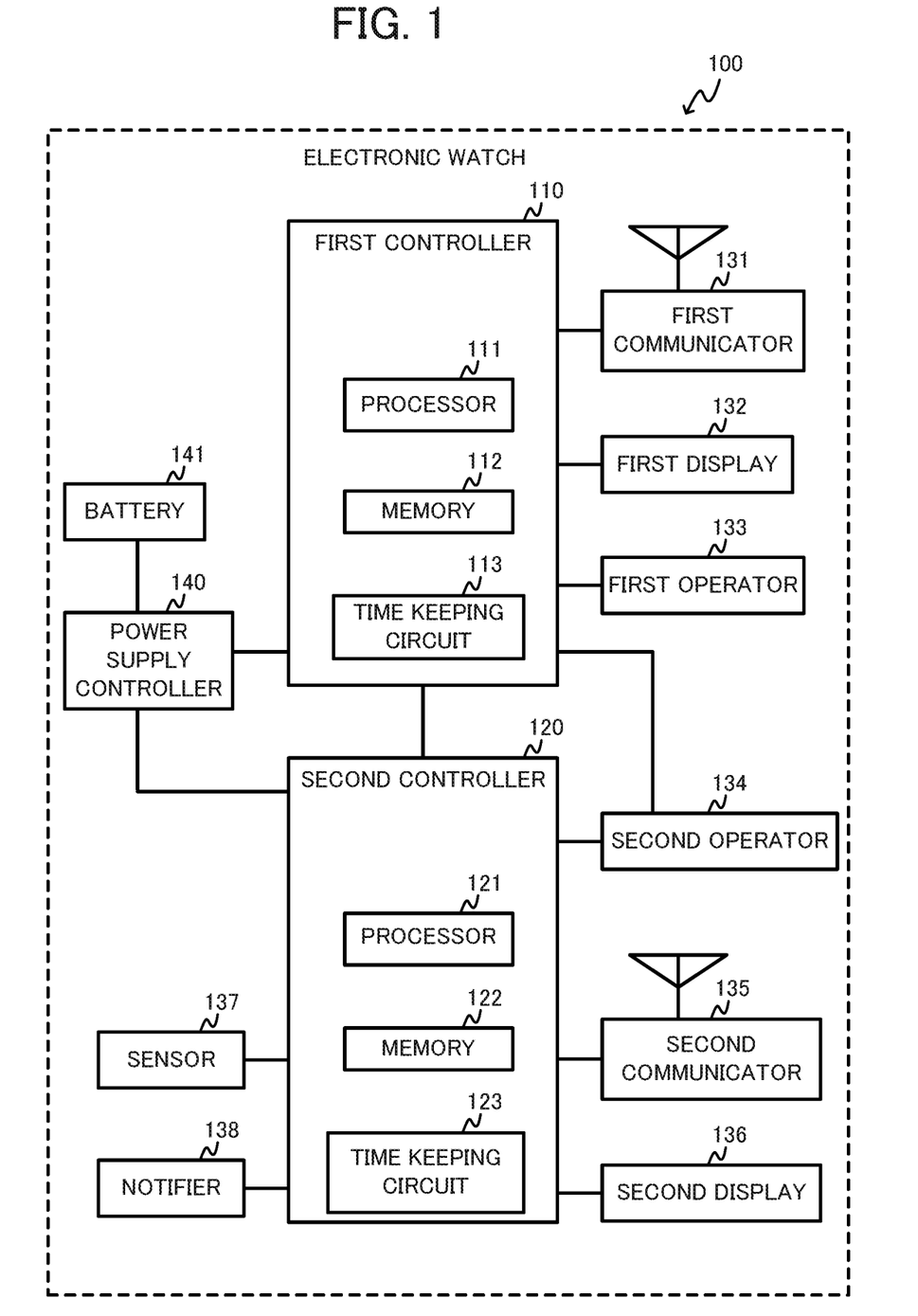
FIG. 1 is a drawing illustrating a configuration example of an electronic watch according to an embodiment.

As illustrated in FIG. 1, an electronic watch 100 that is an example of the electronic device according to the present embodiment includes, as functional components, a first controller 110, a second controller 120, a first communicator 131, a first display 132, a first operator 133, a second operator 134, a second communicator 135, a second display 136, a sensor 137, a notifier 138, a power supply controller 140, and a battery 141.

The first controller 110 includes a processor 111 (first processor), a memory 112, and a time keeping circuit 113. The first controller 110 realizes the functions of the electronic watch 100 as a result of the processor 111 executing a program stored in the memory 112. The first controller 110 includes a function for suppressing power consumption by causing the first controller 110 to sleep. While in the sleep state, the operations of the first controller 110 are basically stopped. When an interrupt signal (wake-up signal) is received from outside, the first controller 110 recovers from the sleep state, assumes an active state, and starts the operations.

The processor 111 is a central processing unit (CPU) with high processing power (for example, a 64-bit CPU with an operating frequency of 1 GHz) that can implement an advanced operating system (OS) such as Android.

The memory 112 includes random access memory (RAM), read-only memory (ROM), and the like. The memory 112 is provided with capacity capable of covering most of the capacity required to realize all of the functions of the electronic watch 100. Note that, the memory 112 is not limited to being provided in the first controller 110, and may be provided outside the first controller 110.

The time keeping circuit 113 measures a time that the electronic watch 100 displays. Note that the time keeping circuit 113 may be configured from software that changes a value stored in the memory 112 every predetermined time (for example, every one second), or may be configured from dedicated hardware. The time measured by the time keeping circuit 113 may be any of cumulative time from a predetermined timing, coordinated universal time (UTC), standard time of a region or country such as Japan Standard Time (JST), the time of a preset city (local time), or the like. Additionally, the time measured by the time keeping circuit 113 need not be in a year-month-day-hour-minute-second format. Note that, the time keeping circuit 113 is not limited to being provided in the first controller 110, and may be provided outside the first controller 110.

The second controller 120 includes a processor 121 (second processor), a memory 122, and a time keeping circuit 123 that measures the time of the electronic watch 100. The second controller 120 realizes functions of the low power consumption operating state of the electronic watch 100 as a result of the processor 121 executing a program stored in the memory 122.

The processor 121 is a CPU that has lower functionality and a slower speed than the processor 111 (for example, a 16-bit CPU with an operating frequency of 16 MHz). As such, the processor 121 is not suited for an advanced operating system. However, the processor 121 has lower power consumption than the processor 111. Moreover, the processor 121 is capable of intermittent operation. As a result of this intermittent operation, the processor 121 can be made to operate for only a short period of time of, for example, once per second, thereby enabling operation at a significantly lower power consumption than the processor 111.

The memory 122 includes RAM, ROM, and the like, and is provided with capacity required for the operations of the processor 121. Note that, the memory 122 and the time keeping circuit 123 are not limited to being provided in the second controller 120, and may be provided outside the second controller 120. For example, a configuration is possible in which all or a part of the memory 112 provided in the first controller 110 is usable as the memory 122 by the second controller 120. Another configuration is possible in which the memory 112 and the memory 122 are implemented as the same external memory, and this same memory is used by both the first controller 110 and the second controller 120.

As with the time keeping circuit 113, the time keeping circuit 123 measures the time that the electronic watch 100 displays. As with the time keeping circuit 113, the time keeping circuit 123 may be configured from software or from dedicated hardware. As with the time keeping circuit 113, the type and format of the time measured by the time keeping circuit 123 are not limited. Note that, the time keeping circuit 123 is not limited to being provided in the second controller 120, and may be provided outside the second controller 120. Another configuration is possible in which the time keeping circuit 113 and the time keeping circuit 123 are implemented as the same external time keeping circuit, and this same time keeping circuit is used by both the first controller 110 and the second controller 120.

The first communicator 131 is a device for wirelessly communicating with other devices (for example, a smartphone), and is a communication device that is compatible with Bluetooth (registered trademark) Classic communication standards, for example.

The first display 132 is a high-definition display capable of displaying color. For example, the first display 132 is a high-definition color liquid crystal display (LCD). However, the first display 132 is not limited to an LCD, and may be an electro-luminescence (EL) display or the like. The first display 132 displays high-definition time and/or an image resulting from the execution of an application/software of the advanced OS.

The first operator 133 includes a touch panel module that is overlaid on the first display 132 and a second display 136. The first operator 133 receives input operations from a user via the touch panel module, and sends, to the first controller 110, electronic signals corresponding to the input operations as input signals. In one example, when the user touches the display of the electronic watch 100, the first operator 133 generates an interrupt signal (wake-up signal), and notifies the first controller 110 that the display has been touched. The first operator 133 detects a contact position and/or a contact mode related to the contact operation on the touch panel module by the user, and sends an operation signal corresponding to the detected contact position and/or contact mode to the first controller 110. A user interface (UI) of the advanced OS is realized by the first display 132 and the first operator 133. The first operator 133 functions as an operation acquirer that acquires user operations.

The second operator 134 includes a crown and/or a button. The second operator 134 receives input operations from the user via the crown and/or the button, and sends, to first controller 110 and the second controller 120, electronic signals corresponding to the input operations as input signals. In one example, the second operator 134 receives an instruction such as time setting or display switching from the user via the crown and/or the button, and sends this instruction to the first controller 110 and the second controller 120.

Note that, in FIG. 1, the first operator 133 is only connected to the first controller 110, and the second operator 134 is connected to the first controller 110 and the second controller 120. However, this is merely an example, and the connection points are not limited to this example. For example, configurations are possible in which the first operator 133 is connected to the first controller 110 and the second controller 120, and in which the first operator 133 is only connected to the second controller 120. Moreover, configurations are possible in which the second operator 134 is only connected to the first controller 110 or is only connected to the second controller 120.

Like the first communicator 131, the second communicator 135 is a device for wirelessly communicating with other devices (for example, a smartphone). However, the power consumption of the second communicator 135 is lower than the power consumption of the first communicator 131, and the communication speed of the second communicator 135 is slower than the communication speed of the first communicator 131. In one example, the second communicator 135 is a communication device that is compatible with Bluetooth (registered trademark) Low Energy (hereinafter referred to as "BLE") communication standards.

In one example, the second display 136 is a display such as a monochrome segment LCD or the like. The power consumption of the second display 136 is lower than the power consumption of the first display 132. The second display 136 can display the time and other information by segments or the like.

The sensor 137 includes sensors such as acceleration sensors, geomagnetic sensors, barometric pressure sensors, and the like. The second controller 120 can acquire the movement, orientation, altitude, and other information of the electronic watch 100 on the basis of the information detected by the sensor 137.

The notifier 138 includes a buzzer and/or a vibration motor. The notifier 138 can notify the user that a time set as an alarm has arrived, that some sort of message has been received, or the like by sounding the buzzer and/or causing the electronic watch 100 to vibrate using the vibration motor.

The power supply controller 140 converts power supply voltage from the battery 141 to a desired voltage, and supplies power to the various devices inside the electronic watch 100. The power supply controller 140 is capable of turning the power supplied to each device (power supply) ON and OFF on the basis of instructions from the first controller 110 and the second controller 120.

Figure 2:
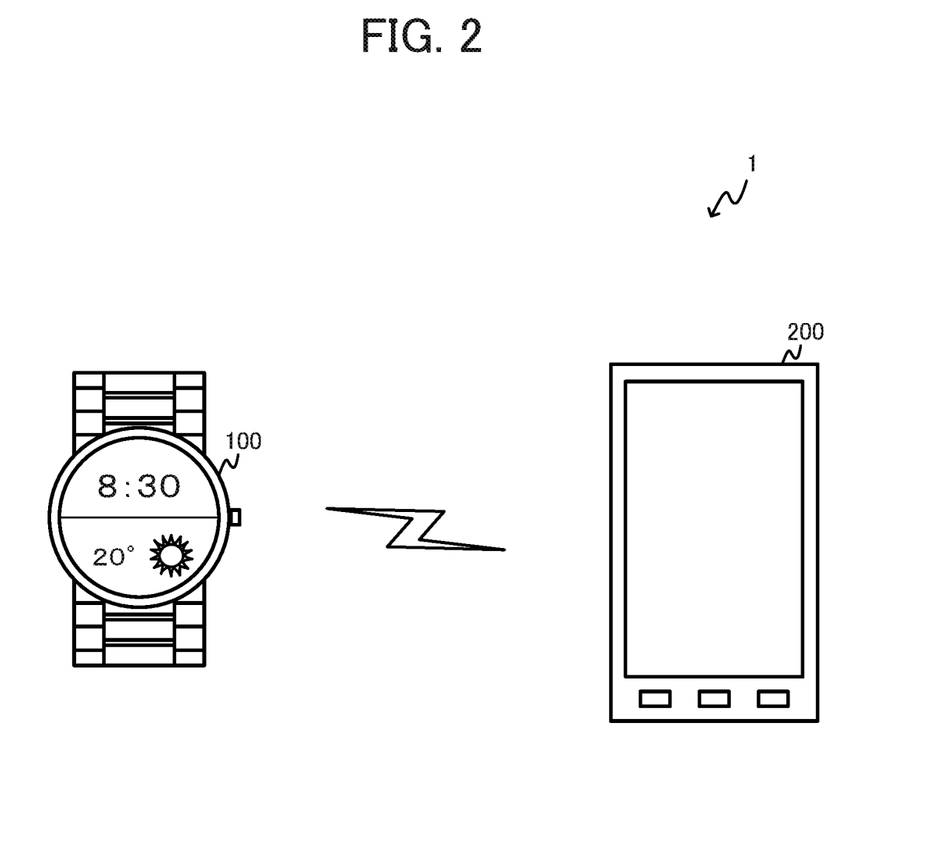
FIG. 2 is a drawing illustrating a configuration example of an electronic device system according to an embodiment.

The functional configuration of the electronic watch 100 is described above. As illustrated in FIG. 2, the electronic watch 100 forms an electronic device system 1 together with a smartphone 200. The smartphone 200 is wirelessly connected to and wirelessly communicates with the electronic watch 100 via Bluetooth (registered trademark). As such, the smartphone 200 can send a received e-mail, for example, to the electronic watch 100 via Bluetooth (registered trademark).

By using the first communicator 131 that is capable of high-speed communication on the advanced OS described above, the electronic watch 100 can receive an e-mail, including the body and attachments, sent from the smartphone 200 in a comparatively short amount of time. Moreover, by using the functions of the advanced OS, the electronic watch 100 can display the body of the e-mail or all of the body, the attachments, and the like of the e-mail. Therefore, in this case, the user can confirm the e-mail on the electronic watch 100 without confirming on the smartphone 200.

However, there are cases in which the electronic watch 100 stops (sleeps, for example) the first communicator 131 and/or the first controller 110 in order to suppress power consumption and, in such cases, processing is carried out by the second controller 120 and/or the second communicator 135. As described above, the processor 121 of the second controller 120 is not suited for the implementation of an advanced OS, and the communication speed of the second communicator 135 is slow. Accordingly, in cases in which the electronic watch 100 is suppressing power consumption, the electronic watch 100 considers the processing speed of the processor 121 and the communication speed of the second communicator 135 and performs only the minimum communication needed instead of receiving all of the body and the like of the e-mail. As a result, the power consumption of the electronic watch 100 can be lowered.

Accordingly, in such cases, the electronic watch 100 uses the processor 121 to display an incoming e-mail icon that indicates that an e-mail has been received. Note that, the level of functionality provided by the processor 121 can be set as desired. For example, in this case, the electronic watch 100 may display the sender and/or the subject of the e-mail instead of or in addition to displaying the incoming e-mail icon. It is assumed that the types of notification signals that the smartphone 200 sends to the electronic watch 100 while connected to the electronic watch 100 by the second communicator 135 are set in advance in the smartphone 200.

Thus, with the electronic watch 100, all of the functions of the electronic watch 100 are executed when the processor 111 is operating but, when the processor 111 is not operating, only limited functions (for example, clock functions, incoming e-mail icon display functions, pedometer functions, biological information (pulse or the like) detection functions, and the like), which are a portion of all of the functions, are executed. However, in cases in which it is sufficient that only the limited functions are executed, there is no need to operate the processor 111 (it is possible to put the processor 111 in a sleep state or in a power OFF state). As such, the power consumption of the electronic watch 100 can be held to a low value.

The two types of operating states of the electronic watch 100 mentioned above are described while referencing FIG. 3. The operating state in which the processor 111 (main CPU) of the electronic watch 100 is operating is referred to as the "normal operating state." The operating state in which the processor 111 is not operating (only the processor 121 (sub CPU) is operating as a processor) is referred to as the "low power consumption operating state." The low power consumption operating state is also referred to as the "power suppression state."

Figure 3:
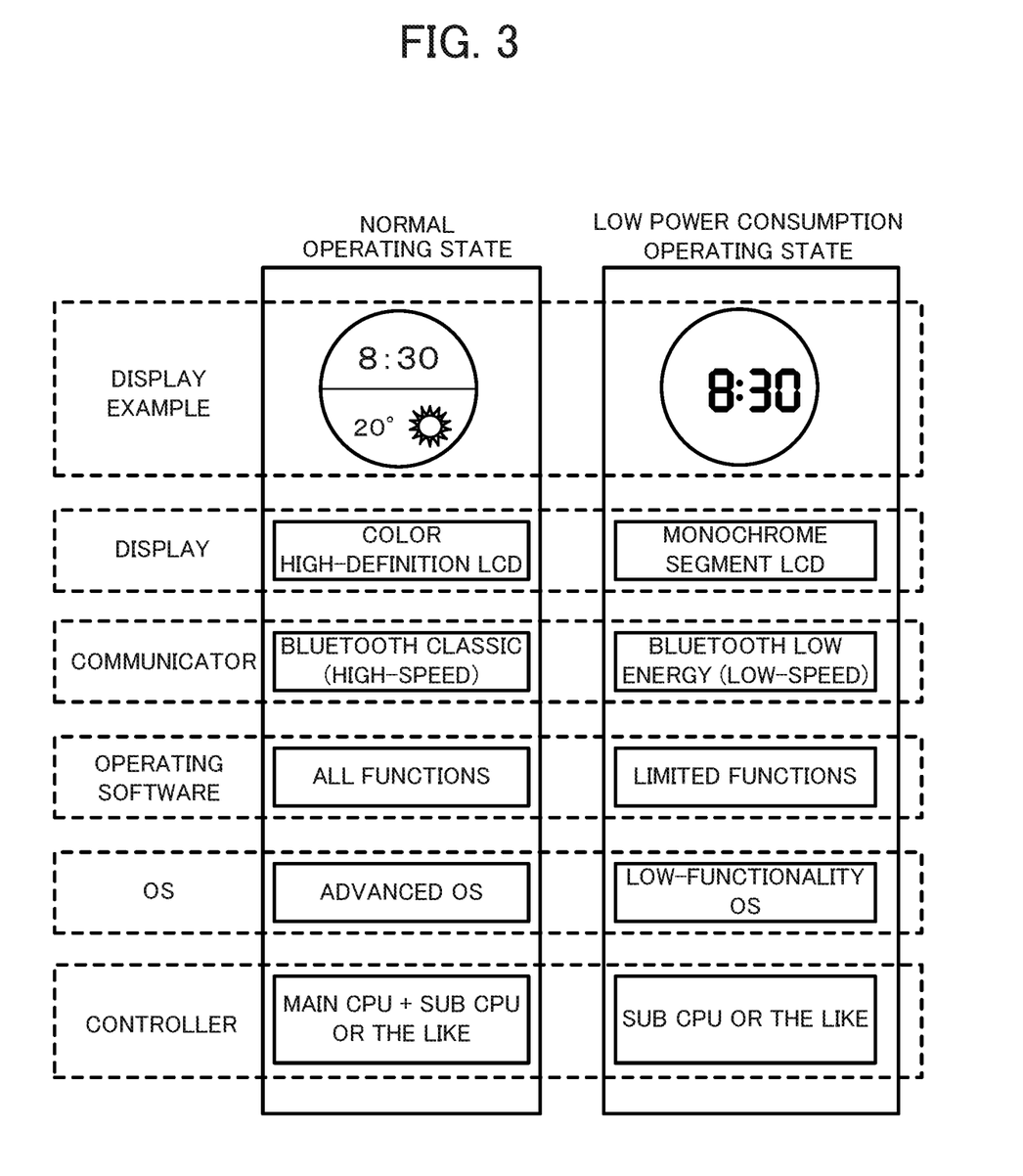
FIG. 3 is a drawing that compares a normal operating state and a low power consumption operating state according to an embodiment.

In the low power consumption operating state, the second controller 120, the first operator 133, the second operator 134, the second communicator 135, the second display 136, the sensor 137, the notifier 138, and the power supply controller 140 operate. Moreover, as illustrated in FIG. 3, a time display using monochrome segments is carried out by the second display 136. In addition, although low-speed, low power consumption BLE communication can be carried out by the second communicator 135. Furthermore, the processing of the limited functions is possible by the low power consumption processor 121 and the low-functionality OS. Since the functions are limited, and operations are carried out by the processor 121, the BLE, and the monochrome segment LCD, the power consumption of the electronic watch 100 decreases.

In the normal operating state, in addition to the hardware that operates in the low power consumption operating state, the first controller 110, the first communicator 131, and the first display 132 also operate. However, in the normal operating state, the second communicator 135 and the second display 136 may be placed in a sleep state or in a power OFF state. Moreover, as illustrated in FIG. 3, in the normal operating state, high-definition color displaying by the first display 132 is carried out. In addition, high-speed communication by Bluetooth (registered trademark) Classic can be carried out by the first communicator 131. Furthermore, the high-speed processor 111 and the advanced OS are capable of executing the processing of all of the functions of the electronic watch 100. However, due to the hardware operations by the processor 111, the Bluetooth (registered trademark) Classic, and the high-definition color LCD, the power consumption of the electronic watch 100 in the normal operating state is greater than the power consumption in the low power consumption operating state.

Figure 4:
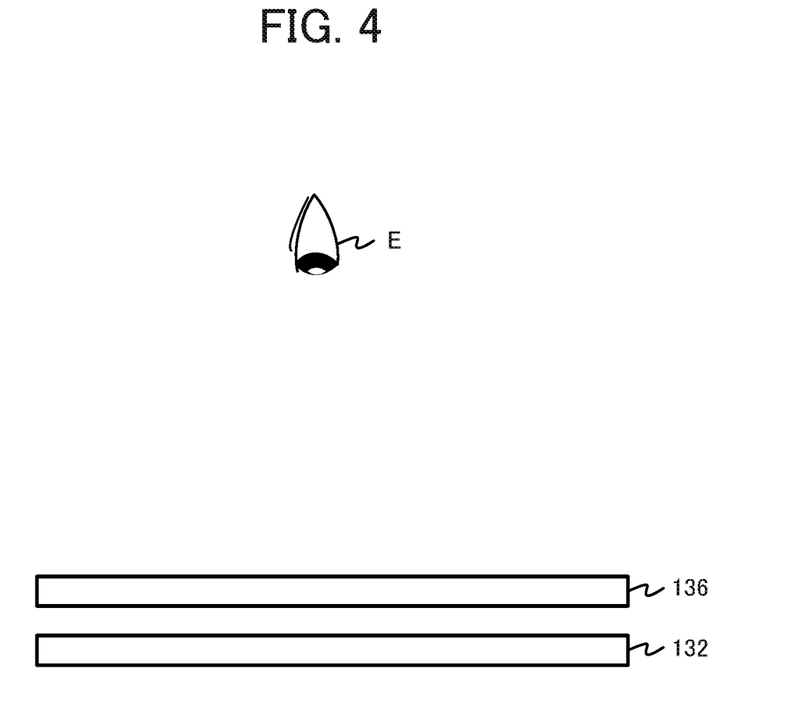
FIG. 4 is a drawing illustrating structures of a first display and a second display according to an embodiment.

Note that, as illustrated in the "Display Examples" of FIG. 3, the display of the monochrome segment LCD is not visible in the normal operating state, and the display of the high-definition LCD is not visible in the low power consumption operating state. As illustrated in FIG. 4, the various types of displaying are realized due to the display having a structure in which the second display 136 is overlaid on the first display 132, and setting the display of the second display 136 to a transparent state when the electronic watch 100 is in the normal operating state. In the normal operating state, the second display 136 is in the transparent state and, as such, only the display of the first display 132 can be seen from eyes E. In the low power consumption operating state, the first display 132 is not driven and, as such, only the display of the second display 136 can be seen from the eyes E. Due to this configuration, the electronic watch 100 can achieve the display of information desired by the user and a decrease in power consumption in a well-balanced manner.

The electronic watch 100 operates by switching between the two operating states described above in accordance with the situation. One example of a situation in which the operating state switches from the normal operating state to the low power consumption operating state is a situation in which a predetermined amount of time (an amount of time set by the user or the like such as five seconds, ten seconds, one minute, or the like) has continued without a user operation. Examples of situations in which the operating state switches from the low power consumption operating state to the normal operating state are situations in which the user operates the touch panel of the electronic watch 100 or a notification signal that indicates an incoming call is received from the smartphone 200.

Figure 5:
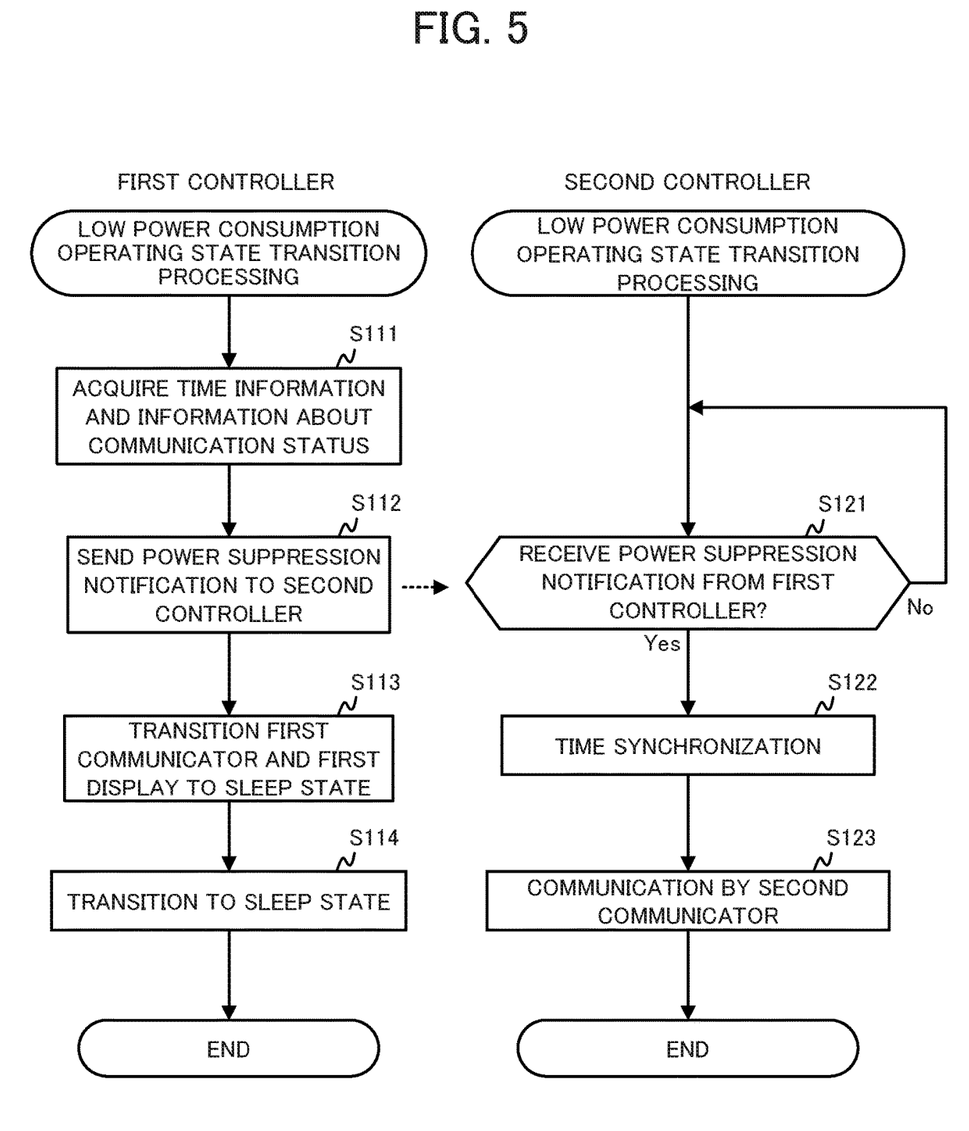
FIG. 5 is a flowchart of low power consumption operating state transition processing according to an embodiment.

Next, processing (low power consumption operating state transition processing) performed when the electronic watch 100 switches from the normal operating state to the low power consumption operating state is described while referencing FIG. 5.

First, the first controller 110 acquires time information measured by the time keeping circuit 113 and information about the communication status of the first communicator 131 (information about connection with communication partner, or the like) (step S111). Next, the first controller 110 sends, to the second controller 120, the time information and the information about the communication status and, also a notification (power suppression notification) informing of transitioning to the low power consumption operating state (step S112).

Then, the first controller 110 transitions the first communicator 131 and the first display 132 to the sleep state (step S113), and transitions the first controller 110 to the sleep state (step S114).

Meanwhile, in the normal operating state, the second controller 120 waits for a power suppression notification to be sent from the first controller 110 (step S121). If the second controller 120 does not receive a power suppression notification (step S121; No), step S121 is executed. If the second controller 120 receives a power suppression notification (step S121; Yes), the second controller 120 synchronizes, on the basis of the time information included in the notification, the time information measured by the time keeping circuit 123 with the time measured by the time keeping circuit 113.

Next, on the basis of the information about the communication status included in the notification, the communication with the partner, that is performed by the first communicator 131, is set as being restartable by the second communicator 135 (step S123). Then, the low power consumption operating state transition processing is ended. Note that the processing of steps S122 and S123 may be performed in any order. For example, the processing of step S123 may be performed and, thereafter, the processing of step S122 may be performed.

As a result of the low power consumption operating state transition processing described above, the electronic watch 100 switches from the normal operating state to the low power consumption operating state. The low power consumption operating state transition processing is also referred to as a "power suppression transition step." Note that, it is thought that there will be cases in which it is difficult to restart the communication by the second communicator 135 on the basis of the information about the communication status of the first communicator 131. In such cases, the communication with the communication partner is disconnected in step S111, and processing for reconnecting to the communication partner is carried out in step S123.

Figure 6:
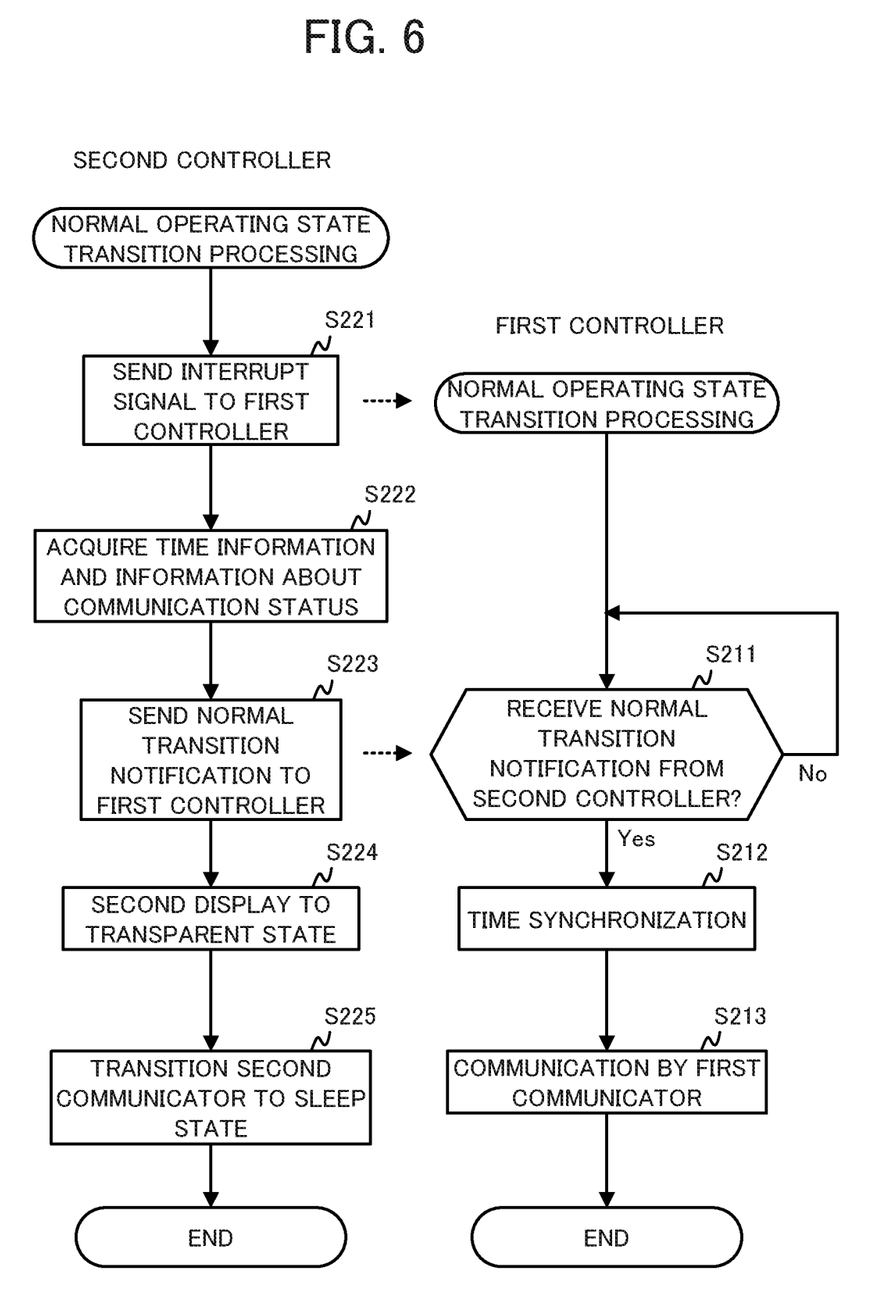
FIG. 6 is a flowchart of normal operating state transition processing according to an embodiment.

Next, processing (normal operating state transition processing) performed when the electronic watch 100 switches from the low power consumption operating state to the normal operating state is described while referencing FIG. 6.

First, the second controller 120 sends an interrupt signal (wake-up signal) to the first controller 110, thereby causing the first controller 110 to recover from the sleep state (step S221). Note that the switching from the low power consumption operating state to the normal operating state is also performed when the user touches the first operator 133 (the touch panel). However, in this case, the first operator 133 sends the interrupt signal (wake-up signal) to the first controller 110 and causes the first controller 110 to recover from the sleep state. Then, the first controller 110, which has recovered from the sleep state due to the interrupt signal from the first operator 133, sends a notification (send request notification) to the second controller 120 requesting that a normal transition notification (described later) be sent. Then, the second controller 120 that has received the send request notification starts the processing from step S222 of the normal operating state transition processing.

The second controller 120 that sends the interrupt signal to the first controller 110 or the second controller 120 that receives the send request notification from the first controller 110 acquires time information measured by the time keeping circuit 123 and information about the communication status of the second communicator 135 (information about connection with communication partner, or the like) (step S222).

Next, the second controller 120 sends, to the first controller 110, the time information and the information about the communication status and, also, a notification (normal transition notification) informing of transitioning to the normal operating state (step S223). Then, the second controller 120 sets the second display 136 to the transparent state (step S224), and transitions the second communicator 135 to the sleep state (step S225). Note that the processing of steps S224 and S225 may be performed in any order. For example, the processing of step S225 may be performed and, thereafter, the processing of step S224 may be performed.

Meanwhile, when the interrupt signal (wake-up signal) is received, the first controller 110 recovers from the sleep state and starts the normal operating state transition processing. The first controller 110 waits for a normal transition notification to be sent from the second controller 120 (step S211). If the first controller 110 does not receive a normal transition notification (step S211; No.), step S211 is executed. If the first controller 110 receives a normal transition notification (step S211; Yes), the first controller 110 synchronizes, on the basis of the time information included in the notification, the time information measured by the time keeping circuit 113 with the time measured by the time keeping circuit 123 (step S212).

Next, on the basis of the information about the communication status included in the notification, the first controller 110 sets the communication with the partner, that is performed by the second communicator 135, as being restartable by the first communicator 131 (step S213). Then, the normal operating state transition processing is ended. Note that the processing of steps S212 and S213 may be performed in any order. For example, the processing of step S213 may be performed and, thereafter, the processing of step S212 may be performed.

As a result of normal operating state transition processing described above, the electronic watch 100 switches from the low power normal operating state to the normal operating state. The normal operating state transition processing is also referred to as a "normal state transition step." Note that, it is thought that there will be cases in which it is difficult to restart the communication by the first communicator 131 on the basis of the information about the communication status of the second communicator 135. In such cases, the communication with the communication partner is disconnected in step S222, and processing for reconnecting to the communication partner is carried out in step S213.

Figure 7:
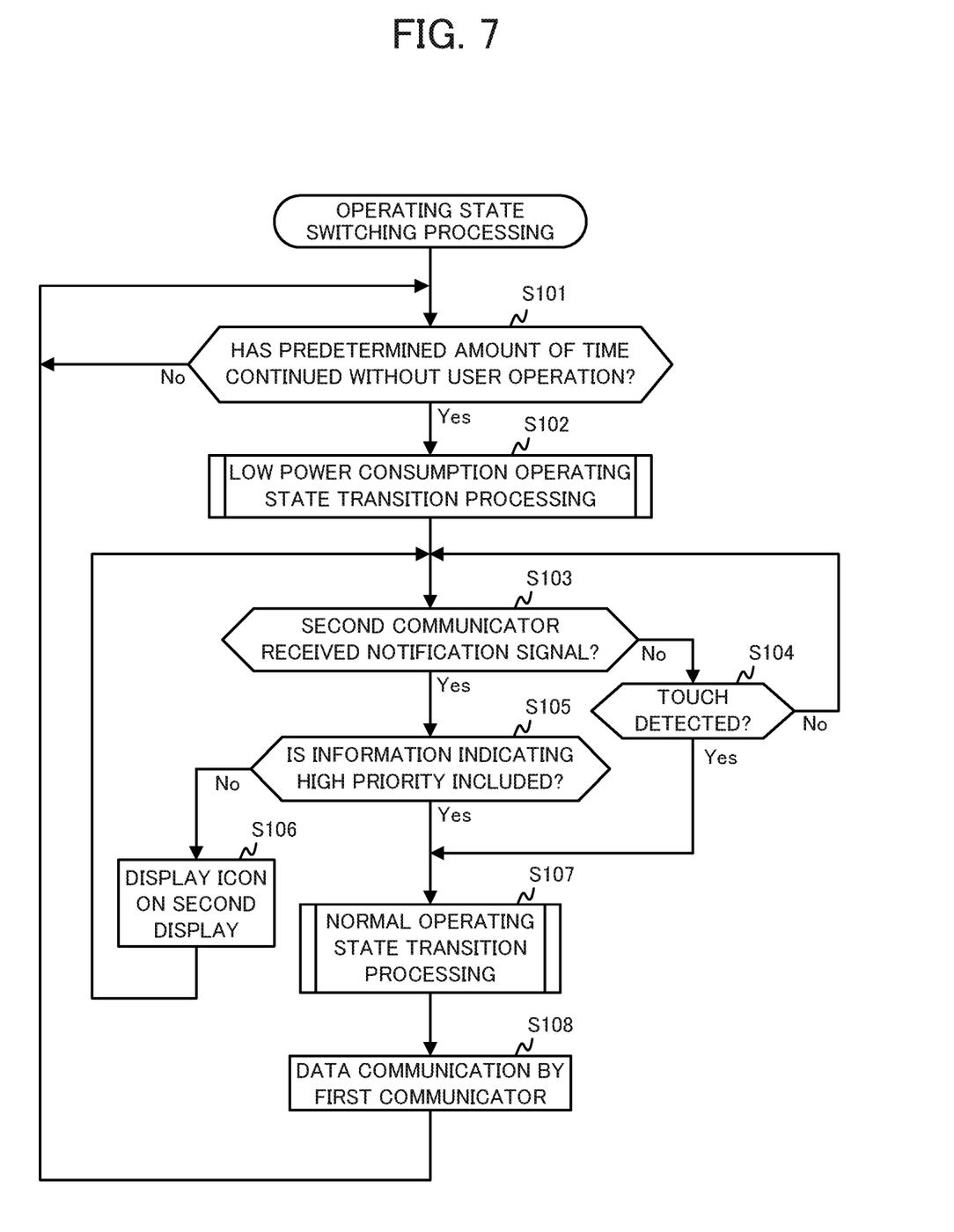
FIG. 7 is a flowchart of operating state switching processing according to an embodiment.

Next, operating state switching processing, which is processing for switching the operating state of the electronic watch 100 in accordance with the situation, is described while referencing FIG. 7. When the electronic watch 100 is started up, the operating state switching processing starts up as one thread, and processing starts in parallel with other threads. Note that, in FIG. 7, it is assumed that the electronic watch 100 is in the normal operating state when started up. However, if it is assumed that the electronic watch 100 is in the low power consumption operating state when started up, the operating state switching processing may start from step S103.

The first controller 110 determines, on the basis of signals from the first operator 133 and the second operator 134, whether a predetermined amount of time (for example, three seconds) without a user operation has continued (step S101). If the predetermined amount of time without a user operation has not continued (step S101; No), step S101 is executed.

If the predetermined amount of time without a user operation has continued (step S101; Yes), the first controller 110 and the second controller 120 carry out the low power consumption operating state transition processing described above and the electronic watch 100 transitions to the low power consumption operating state (step S102).

Next, the second controller 120 determines whether the second communicator 135 has received a notification signal from the smartphone 200 (step S103). Here, the "notification signal" is, for example, a signal notifying that the smartphone 200 has received an incoming call or an e-mail. If the second communicator 135 has not received a notification signal (step S103; No), the first operator 133 determines if a touch on the touch panel module by the user is detected (step S104). If a touch is not detected (step S104; No), step S103 is executed. If a touch is detected (step S104; Yes), step S107 is executed.

Meanwhile, if the second communicator 135 does receive a notification signal in step S103 (step S103; Yes), the second controller 120 determines whether information indicating high priority is included in the notification signal (step S105). The priority is set, in advance, by the user, the e-mail sender, the electronic device system 1, or the like. For example, the information indicating high priority is included in a notification signal informing of an incoming call, a notification signal of an e-mail from a sender set as high priority by the user, or the like. In step S105, the second controller 120 functions as a priority acquirer.

If the information indicating high priority is not included in the notification signal (step S105; No), the second controller 120 displays an icon on the second display 136 (step S106), and executes step S103. Here, the "icon" is, for example, a pattern that indicates the arrival of an e-mail. Various patterns of the icon are formed in the second display 136 by segments.

If the information indicating high priority is included in the notification signal (step S105; Yes), the second controller 120 carries out the normal operating state transition processing described above and causes the first controller 110 to recover from the sleep state, and the electronic watch 100 transitions to the normal operating state (step S107). Then, the first controller 110 starts data communication with the smartphone 200 using the first communicator 131 (step S108), and carries out the receipt of the e-mail body or the like in accordance with an instruction from the user. Thereafter, step S101 is executed.

The operating state switching processing is described above. As a result of the operating state switching processing described above, the electronic watch 100 is operated for as long a time as possible in the low power consumption operating state, and also transitions quickly to the normal operating state when the user attempts to execute a function other than the limited functions. Therefore, the battery life of the electronic watch 100 can be extended without the user noticing that the electronic watch 100 is in a state in which functions are limited. That is, the electronic watch disclosed in Unexamined Japanese Patent Application Kokai Publication No. 2016-161324 attempts to maintain basic functions over an extended period of time by carrying out function limiting that corresponds to the voltage of a secondary battery. However, this electronic watch does not limit the functions until the voltage of the secondary battery declines and, consequently, consumes a large amount of power.

Accordingly, cases are anticipated in which the voltage of the secondary battery has already declined at the time at which the user attempts to use a function other than the basic functions and, in such cases, the user will not be able to use the functions other than the basic function. According to the present disclosure, the battery life can be extended without making the user feel function limitations.

Note that, to prevent complicating the description, in the operating state switching processing illustrated in FIG. 7, only the receipt determination of the notification signal (step S103) and the detection determination of the touch (step S104) act as triggers for the transition from the low power consumption operating state to the normal operating state, but the present embodiment is not limited thereto. For example, cases are included in which the color display is displayed due to a movement of the wrist (by a gesture operation) that the user performs to confirm information such as the number of steps on the color display (the first display 132). In such a case, the second controller 120 determines, on the basis of a detected value of the acceleration sensor of the sensor 137, whether a gesture operation is performed and, when a gesture operation is detected, executes step S107. Thus, since the electronic watch 100 also switches to the normal operating state due to gesture operations, concerns about the user feeling operational discomfort due to the low power consumption operating state can be mitigated.

Additionally, a modified example is possible in which the user sets, in advance, whether "the user desires that the icon always be displayed (the user desires that the electronic watch 100 maintain the low power consumption operating state (the power suppression state) as long as possible) and, immediately prior to step S105 of FIG. 7, the second controller 120 determines if "the user setting is that the icon always be displayed." In this modified example, if the determination is Yes, step S106 is executed and, if the determination is No, step S105 is executed. At the time of the determination, the second controller 120 functions as a user setting acquirer.

In this modified example, in cases in which the user has performed the setting of "always display the icon", the electronic watch 100 maintains the low power consumption operating state in which the icon is displayed, even when a notification signal sent from the smartphone 200 is received, and executes step S107 for the first time when a touch operation or a gesture operation by the user is detected. Due to this configuration, the electronic watch 100 can maintain the low power consumption operating state so long as the user does not switch to the normal operating state, and the battery life can be extended a corresponding amount.

While not described above, in the operating state switching processing illustrated in FIG. 7, when transitioning to the normal state in step S107, the second controller 120 may control the notifier 138 and notify the user about the transition to the normal state. For example, a predetermined sound may be output, or the electronic watch 100 may be caused to vibrate in a predetermined vibration pattern. Likewise, when displaying the icon on the second display 136 in step S106, the second controller 120 may control the notifier 138 and notify the user that the icon is displayed. Due to this configuration, when information is received that the user must be notified of immediately, that information can be immediately notified to the user, even when operating in the low power consumption operating state.

Note that the present disclosure is not limited to the embodiment described above and various combination and modifications are possible.

For example, in the embodiment described above, an example is described in which the first communicator 131 is a communication device that is compatible with Bluetooth (registered trademark) Classic communication standards, and the second communicator 135 is a communication device that is compatible with BLE communication standards. However, the present disclosure is not limited thereto. For example, an embodiment is possible in which the first communicator 131 is a communication device that is compatible with a high-speed wireless LAN communication standard such as IEEE802.11n, and the second communicator 135 is a communication device that is compatible with Bluetooth (registered trademark) Classic communication standards. Provided that there is a relationship whereby the power consumption of the second communicator 135 is lower than the power consumption of the first communicator 131, the electronic watch 100 can use communication devices that are compatible with any communication standards that satisfy the required specifications.

The relationship between the first display 132 and the second display 136 is the same as the relationship between the first communicator 131 and the second communicator 135 and, provided that the power consumption of the second display 136 is lower than the power consumption of the first display 132, the electronic watch 100 can use any first display 132 and second display 136 that satisfy the required specifications. Likewise, provided that the power consumption of the second controller 120 is lower than the power consumption of the first controller 110, the electronic watch 100 can use any first controller 110 and second controller 120 that satisfy the required specifications.

In the embodiment described above, an example is described in which the first communicator 131 and the first controller 110 are placed in the sleep state, and the second controller 120 or the first operator 133 cause the first controller 110 to recover from the sleep state. However, the present disclosure is not limited thereto. For example, a configuration is possible in which the first controller 110 transitions to the sleep state but the first communicator 131 maintains the wireless communication connection without transitioning to the sleep state, and the first communicator 131 causes the first controller 110 to recover from the sleep state when the first communicator 131 receives a signal or information other than to maintain the wireless communication connection with between the electronic watch 100 and the smartphone 200.

In the embodiment described above, the electronic watch 100 is described as an example of an electronic device that includes the first controller 110 and the second controller 120. However, the present disclosure is not limited to electronic watches and can be applied to any electronic device that includes a first device group (the first controller 110, the first communicator 131, and the first display 132) that has high performance and high power consumption and a second device group (the second controller 120, the second communicator 135, and the second display 136) that has lower performance and lower power consumption than the first device group. Examples of such electronic devices include smartwatches, smartphones, and wearable devices.

The programs executed by the first controller 110 and the second controller 120 can be applied by storing the programs on a non-transitory computer-readable recording medium such as a flexible disc, a compact disc (CD) ROM, a digital versatile disc (DVD) ROM, and a memory card. Furthermore, the programs can be superimposed on a carrier wave and applied via a communication medium such as the internet. For example, the programs may be posted to and distributed via a bulletin board system (BBS) on a communication network. Moreover, a configuration is possible in which the processing described above is executed by starting the programs and, under the control of the operating system (OS), executing the programs in the same manner as other applications/programs.

In addition, the specific details such as the configurations, the control procedures, and the display examples described in the embodiments may be appropriately modified without departing from the scope of the present disclosure.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An electronic device, comprising:
   a first display;
   a second display for which power consumption is lower than that of the first display, the second display being overlaid on the first display and being configured to be controlled to be in a transparent state so that a display by the first display is visible through the second display;
   a first communicator configured to wirelessly communicate with an external device;
   a second communicator for which power consumption is lower than that of the first communicator, the second communicator being configured to wirelessly communicate with the external device;
   a first time keeping circuit configured to measure time information to be displayed by the first display;
   a second time keeping circuit configured to measure time information to be displayed by the second display;
   a first processor;
   a second processor for which power consumption is lower than that of the first processor; and
   an operation acquirer configured to, when an operation from a user is acquired, send a wake-up signal that causes the first processor to recover from a sleep state in which power consumption is suppressed to a normal state that is a normal operating state,
   wherein the first processor is configured to, when a condition for transitioning to a power suppression state that is an operating state in which power consumption is suppressed is satisfied, send a power suppression notification to the second processor, the power suppression notification including the time information measured by the first time keeping circuit, stop displaying by the first display and communicating by the first communicator, and transition to the sleep state,
   wherein the second processor is configured to, when the second processor receives the power suppression notification from the first processor, synchronize the time information measured by the second time keeping circuit with the time information included with the power suppression notification, control the second display to start displaying the synchronized time information measured by the second time keeping circuit display and control the second communicator to wirelessly communicate with the external device, and
   wherein the second processor is configured to, when a condition for transitioning to the normal state is satisfied, send the wake-up signal to the first processor, send a normal transition notification to the first processor, the normal transition notification including the time information measured by the second time keeping circuit while the first processor is in the sleep state, stop the displaying by the second display such that the second display is in the transparent state, and stop the communicating by the second communicator, and
   wherein the first processor is configured to, when the first processor receives the normal transition notification, recover to the normal state from the sleep state, synchronize the time information measured by the first time keeping circuit with the time information included with the normal transition notification, control the first display to start displaying the synchronized time information measured by the first time keeping circuit while the second display is in the transparent state, and start communication by the first communicator.

2. The electronic device according to claim 1, wherein the condition for transitioning to the power suppression state comprises a predetermined amount of time elapsing during which there is no acquisition of the operation by the operation acquirer.

3. The electronic device according to claim 1, wherein the condition for transitioning to the normal state comprises the second communicator receiving information indicating an incoming call.

4. The electronic device according to claim 1, wherein the second processor is configured to acquire a priority of information received by the second communicator, and
   wherein the condition for transitioning to the normal state comprises that the second communicator received information for which the priority acquired by the second processor is high.

5. The electronic device according to claim 2, wherein the second processor is configured to acquire a priority of information received by the second communicator, and
   wherein the condition for transitioning to the normal state comprises that the second communicator received information for which the priority acquired by the second processor is high.

6. The electronic device according to claim 4, wherein the second processor is configured to, when the priority of the information received by the second communicator is not high, control the second display to display an icon indicating that the information is received.

7. The electronic device according to claim 5, wherein the second processor is configured to, when the priority of the information received by the second communicator is not high, control the second display to display an icon indicating that the information is received.

8. The electronic device according to claim 1, further comprising:
an acceleration sensor configured to detect an acceleration,
wherein the condition for transitioning to the normal state comprises the second processor determining that a value detected by the acceleration sensor indicates a predetermined movement.

9. The electronic device according to claim 1,
wherein the second processor is configured to acquire a setting of whether or not the user desires to maintain the power suppression state, and
when the setting acquired by the second processor is that the user desires to maintain the power suppression state, the second processor is configured to control the second display to maintain the displaying and to control the second communicator to maintain the communicating, without sending the wake-up signal to the first processor even when information received by the second communicator satisfies the condition for transitioning to the normal state.

10. The electronic device according to claim 1, further comprising:
a notifier configured to notify the user by vibration or sound that the operating state switched,
wherein the second processor is configured to control the notifier to notify the user when the condition for transitioning to the normal state is satisfied.

11. A control method for an electronic device including a first display, a second display for which power consumption is lower than that of the first display, the second display being overlaid on the first display and being configured to be controlled to be in a transparent state so that a display by the first display is visible through the second display, a first communicator configured to wirelessly communication with an external device, a second communicator for which power consumption is lower than that of the first communicator, the second communicator being configured to wirelessly communicate with the external device, a first time keeping circuit configured to measure time information to be displayed by the first display, a second time keeping circuit configured to measure time information to be displayed by the second display, a first processor, a second processor for which power consumption is lower than that of the first processor, and an operation acquirer configured to, when an operation from a user is acquired, send a wake-up signal that causes the first processor to recover from a sleep state in which power consumption is suppressed to a normal state that is a normal operating state,
the control method comprising:
when a condition for transitioning to a power suppression state that is an operating state in which power consumption is suppressed is satisfied, sending, by the first processor, a power suppression notification to the second processor, the power suppression notification including the time information measured by the first time keeping circuit, stopping, by the first processor, displaying by the first display and communicating by the first communicator, transitioning the first processor to a sleep state
when the second processor receives the power suppression notification from the first processor, synchronizing, by the second processor, the time information measured by the second time keeping circuit with the time information included with the power suppression notification, controlling, by the second processor, the second display to start displaying the synchronized time information measured by the second time keeping circuit and controlling, by the second processor, the second communicator to wirelessly communicate with the external device;
when a condition for transitioning to the normal state is satisfied, sending, by the second processor, the wake-up signal to the first processor, sending, by the second processor, a normal transition notification to the first processor, the normal transition notification including the time information measured by the second time keeping circuit while the first processor is in the sleep state, stopping, by the second processor, the displaying by the second display such that the second display is in the transparent state, and stopping, by the second processor, the communicating by the second communicator; and
when the first processor receives the normal transition notification, recovering, by the first processor, to the normal state from the sleep state, synchronizing, by the first processor, the time information measured by the time keeping circuit with the time information included with the normal transition notification, controlling, by the first processor, the first display to start displaying the synchronized time information measured by the first time keeping circuit while the second display is in the transparent state, and starting, by the first processor, communication by the first communicator.

12. The control method according to claim 11,
wherein the condition for transitioning to the power suppression state comprises a predetermined amount of time elapsing during which there is no acquisition of the operation by the operation acquirer.

13. The control method according to claim 11, further comprising:
acquiring, by the second processor, a priority of information received by the second communicator,
wherein the condition for transitioning to the normal state comprises that the second communicator received information for which the priority acquired by the second processor is high.

14. The control method according to claim 12, further comprising:
acquiring, by the second processor, a priority of information received by the second communicator,
wherein the condition for transitioning to the normal state includes that the second communicator received information for which the priority acquired by the second processor is high.

15. A non-transitory computer-readable recording medium having stored therein a program that causes a computer of an electronic device including a first display, a second display for which power consumption is lower than that of the first display, the second display being overlaid on the first display and being configured to be controlled to be in a transparent state so that a display by the first display is visible through the second display, a first communicator configured to wirelessly communication with an external device, a second communicator for which power consumption is lower than that of the first communicator, the second communicator being configured to wirelessly communicate with the external device, a first time keeping circuit configured to measure time information to be displayed by the first display, a second time keeping circuit configured to measure time information to be displayed by the second display, a first processor, a second processor for which power consumption is lower than that of the first processor and an operation acquirer configured to, when an operation from a user is acquired, send a wake-up signal that causes the first processor to recover from a sleep state in which power consumption is suppressed to a normal state that is a normal operating state, to execute processing of:

when a condition for transitioning to a power suppression state that is an operating state in which power consumption is suppressed is satisfied, sending, by the first processor, a power suppression notification to the second processor, the power suppression notification including the time information measured by the first time keeping circuit, stopping, by the first processor, displaying by the first display and communicating by the first communicator, transitioning the first processor to a sleep state when the second processor receives the power suppression notification from the first processor, synchronizing, by the second processor, the time information measured by the second time keeping circuit with the time information included with the power suppression notification, controlling, by the second processor, the second display to start displaying the synchronized time information measured by the second time keeping circuit and controlling, by the second processor, the second communicator to wirelessly communicate with the external device;

when a condition for transitioning to the normal state is satisfied, sending, by the second processor, the wake-up signal to the first processor, sending, by the second processor, a normal transition notification to the first processor, the normal transition notification including the time information measured by the second time keeping circuit while the first processor is in the sleep state, stopping, by the second processor, the displaying by the second display such that the second display is in the transparent state, and stopping, by the second processor, the communicating by the second communicator; and when the first processor receives the normal transition notification, recovering, by the first processor, to the normal state from the sleep state, synchronizing, by the first processor, the time information measured by the time keeping circuit with the time information included with the normal transition notification, controlling, by the first processor, the first display to start displaying the synchronized time information measured by the first time keeping circuit while the second display is in the transparent state, and starting, by the first processor, communication by the first communicator.

* * * * *